(12) United States Patent
Taylor

(10) Patent No.: US 10,095,807 B2
(45) Date of Patent: Oct. 9, 2018

(54) LINKED DATA PROCESSOR FOR DATABASE STORAGE

(71) Applicant: MICROSOFT TECHNOLOGY LICENSING, LLC, Redmond, WA (US)

(72) Inventor: John Anthony Taylor, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 594 days.

(21) Appl. No.: 14/698,669

(22) Filed: Apr. 28, 2015

(65) Prior Publication Data

US 2016/0321376 A1    Nov. 3, 2016

(51) Int. Cl.
*G06F 17/30* (2006.01)

(52) U.S. Cl.
CPC .. *G06F 17/30958* (2013.01); *G06F 17/30336* (2013.01); *G06F 17/30961* (2013.01)

(58) Field of Classification Search
CPC ......... G06F 17/30661; G06F 17/30958; G06F 17/30336
USPC ....................................................... 707/741
See application file for complete search history.

(56) References Cited

U.S. PATENT DOCUMENTS

| | | | | |
|---|---|---|---|---|
| 5,630,025 A * | 5/1997 | Dolby | ............... | G06F 17/509 706/45 |
| 6,108,698 A * | 8/2000 | Tenev | ............... | G06F 17/30958 707/E17.011 |
| 6,499,036 B1 * | 12/2002 | Gurevich | ............... | G06F 9/542 707/778 |
| 7,111,016 B2 * | 9/2006 | Gurevich | ............... | G06F 9/542 717/108 |
| 7,376,658 B1 * | 5/2008 | Bumgarner | ....... | G06F 17/30557 707/736 |
| 7,490,265 B2 * | 2/2009 | Baskey | ............... | G06F 11/1482 714/15 |
| 7,739,314 B2 * | 6/2010 | Datar | ................. | G06Q 30/02 707/803 |
| 7,917,538 B2 * | 3/2011 | Gurevich | ............... | G06F 9/542 707/802 |
| 8,019,771 B2 * | 9/2011 | Iwao | ................. | G06F 17/30566 707/759 |
| 8,060,544 B2 * | 11/2011 | Werner | ............... | G06F 8/456 708/200 |
| 8,280,987 B2 | 10/2012 | McGowan et al. | | |

(Continued)

OTHER PUBLICATIONS

"Storing and Analyzing Your Data in Google's Cloud", Retrieved on: Dec. 12, 2014 Available at: https://cloud.google.com/developers/articles/storage-overview/.

(Continued)

*Primary Examiner* — Shahid Alam
(74) *Attorney, Agent, or Firm* — Shook, Hardy & Bacon, L.L.P.

(57) ABSTRACT

Systems and methods are provided for storing and retrieving data using a linked data model having a tree format. Instead of using a traditional relational database, a linked data model can be used with links between data items that reflect the underlying business logic. To facilitate retrieval of data, the data items stored using the linked data model can be individually addressable.

10 Claims, 14 Drawing Sheets

(56) References Cited

U.S. PATENT DOCUMENTS

| | | | |
|---|---|---|---|
| 8,433,685 B2* | 4/2013 | Hayden | G06F 17/30212 |
| | | | 707/640 |
| 8,612,439 B2 | 12/2013 | Prahlad et al. | |
| 8,706,782 B2 | 4/2014 | Cohen et al. | |
| 8,719,223 B2 | 5/2014 | Knapp et al. | |
| 8,849,761 B2 | 9/2014 | Prahlad et al. | |
| 8,874,930 B2* | 10/2014 | Chase | G06F 21/6227 |
| | | | 380/28 |
| 2003/0227487 A1* | 12/2003 | Hugh | G06F 17/30958 |
| | | | 715/777 |
| 2008/0005194 A1* | 1/2008 | Smolen | G06F 17/30348 |
| | | | 707/804 |
| 2008/0114770 A1* | 5/2008 | Chen | G06F 17/30566 |
| | | | 707/669 |
| 2010/0211924 A1* | 8/2010 | Begel | G06F 8/74 |
| | | | 717/101 |
| 2011/0320431 A1* | 12/2011 | Jackson | G06F 17/30389 |
| | | | 707/713 |
| 2012/0179779 A1 | 7/2012 | Awasthi | |
| 2012/0303736 A1 | 11/2012 | Novotny et al. | |
| 2013/0041808 A1 | 2/2013 | Pham et al. | |
| 2014/0040363 A1 | 2/2014 | Reddy et al. | |
| 2014/0108474 A1 | 4/2014 | David et al. | |

OTHER PUBLICATIONS

"Linked Data Glossary", Published on: Jun. 27, 2013 Available at: http://www.w3.org/TR/ld-glossary/.

* cited by examiner

LINKED DATA PROCESSOR FOR DATABASE STORAGE

BACKGROUND

A cloud computing platform can provide users with the ability to build, deploy, and manage services and applications in a distributed computing environment, i.e., the cloud. An ongoing challenge in improving cloud-based services is determining how to adapt traditional small scale applications to take advantage of the resources available in a distributed environment.

An example of an application type that may need adaptation in a cloud environment is relational database technology. Techniques for optimizing the performance of databases in a small scale environment have previously been the focus of substantial research. However, these prior solutions for use of database technology do not necessarily translate well to a distributed computing environment.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various aspects, systems and methods are provided for storing and retrieving data using a linked data model having a tree format. Instead of using a traditional relational database, a linked data model can be used with links between data items that reflect the underlying business logic. To facilitate retrieval of data, the data items stored using the linked data model can be individually addressable.

BRIEF DESCRIPTION OF THE DRAWINGS

Aspects of the invention are described in detail below with reference to the attached drawing figures, wherein.

DETAILED DESCRIPTION

Figure 1:
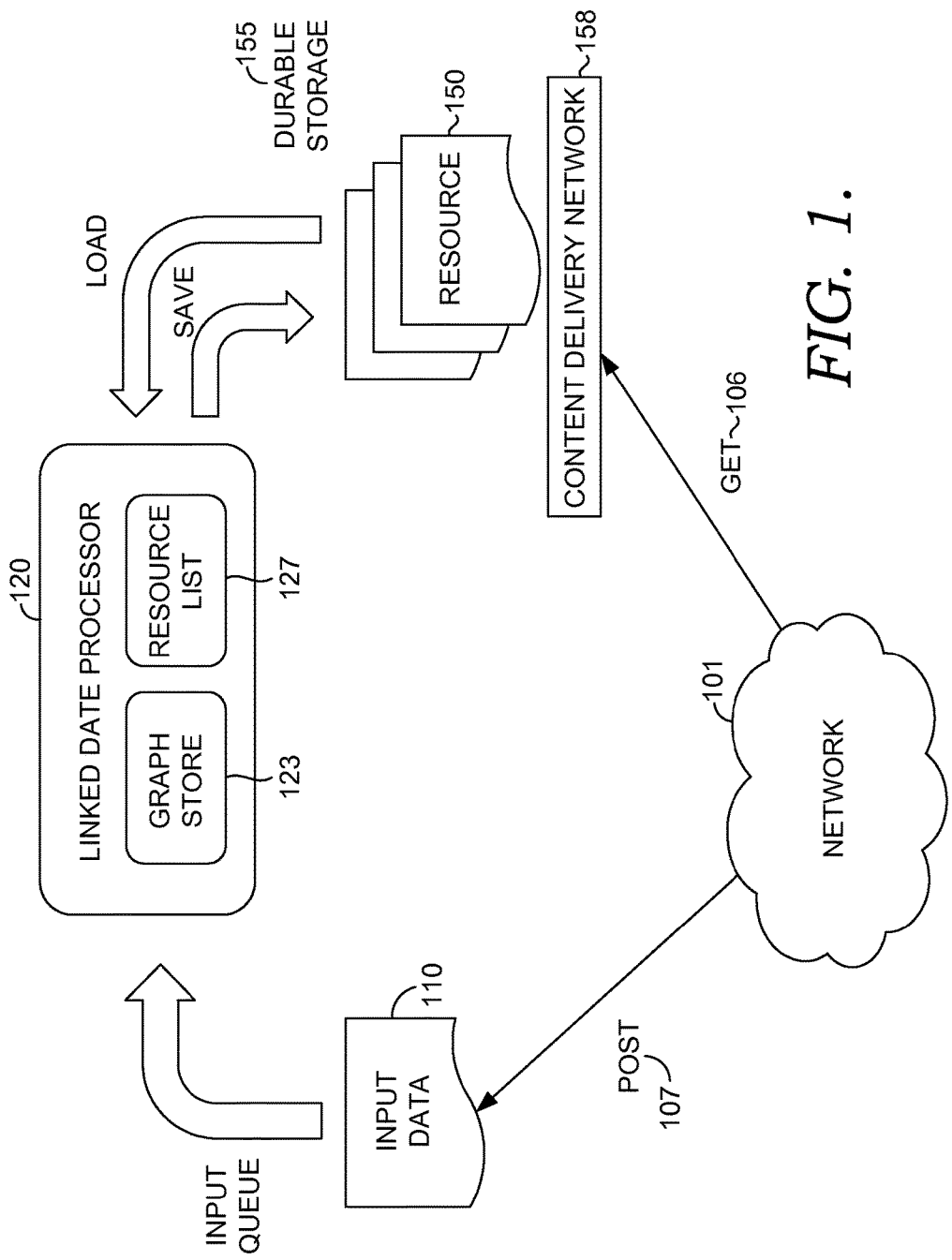
FIG. 1 schematically shows an example of data flows for saving and loading of data in a distributed computing environment using a linked data model.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

Overview

In various aspects, systems and methods are provided for storing data in a distributed storage environment in a manner that can allow for efficient retrieval of data. The systems and methods can allow for storage of data items as documents using a linked data model having a tree-based format. The links between documents or data items can be correspond to the relationship between the various documents from a business perspective, such as a link between a first document having a general description for a product and a second document having price and/or availability information for the product. The individual documents can each have a separate address, such as a Hypertext Transfer Protocol-type (HTTP) address, to facilitate unique identification of data.

By using a linked data model having a tree format, instead of spending time processing and translating a query to match a data-structure specific format, additional time is spent saving data items as documents so that data for responding to user queries is saved in a convenient format. This can allow the relatively cheap distributed resource of additional storage to be used while reducing or minimizing the relatively expensive resource of processor time when responding to a query.

Use of a linked data model for storing data can allow the methods for storing data to be separated from the methods used for retrieving data. Based on the underlying business logic for a data set, the links between input data items and other data items can be provided when the data item is initially received. Any stored data items that are sufficiently related to the new data items can then be pulled into storage. Such related data items can be identified, for example, by applying a set of rules to a graph representation of the new data items. Such rules can be based on the links between data items and/or based on the groupings of data items that are stored together as a resource in durable storage. Additionally, any other documents that may have a modification due to the new data item can also be updated. Such modifications of a document can include (but are not limited to) addition of links, modification of links, and/or changes in the content of a document. After all new data items and related data items are in memory (and optionally updated based on the input data), a set of rules can be used to determine how to distribute the data items between a plurality of resources that are saved to durable storage locations.

By storing data items using a linked data model with a tree format, retrieval of data items from storage can be simplified. When a request for one or more data items is received, the request can be processed by identifying the data storage tree(s) that are relevant to the request, and then traversing the data storage tree(s) to retrieve the documents matching the request. This can reduce or minimize the need to translate a query received from a user into a data-structure specific language, such as SQL. As a result, the amount of processor time required to respond to a data query can be reduced. In some aspects, the amount of additional data processing during data retrieval can be reduced or minimized by creating data items corresponding to at least some potential queries. In such aspects, a responsive data item to a data query can correspond to a document that can be directly served to a user and/or other requesting entity.

In this discussion, a data item is defined as any type or amount of data that can be saved and assigned a distinct address, such as an HTTP address, that allows the data item to be retrieved, loaded, or otherwise accessed based on the distinct address.

In this discussion, a resource is defined as a collection of one or more data items that are saved together in durable storage. Optionally but preferably, the data items in the resource can be data items are linked together in a manner so that starting from any data item in a resource, any other data item can be accessed by traversing the links between data items.

Linked Data Model and Linked Data Processor

Conventionally, one of the advantages of using a distributed computing platform (sometimes referred to as a cloud computing platform) is that the associated distributed storage can offer highly reliable storage at a very low cost. However, raw storage (e.g., an operating system UNIX or WINDOWS style file system or cloud computing blob storage) has proven difficult to effectively program as an application's primary storage technology with the result that conventional methods of providing distributed storage are generally used in tandem with other, more traditional, and specifically more compute intensive, database server products. The conventional combined solution of using database server products in a distributed computing environment can add on the high computing cost of a traditional database while reducing the reliability promised by the basic distributed storage product.

Some of the difficulties in using a traditional database product for distributed storage can be related to assumptions that are inherent to traditional programming models for business applications. One conventional assumption is that of synchronous behavior with respect to reads having full access to data following writes. A second conventional assumption is that all business logic needs the ability to fully query the whole data set.

In contrast to a conventional database structure approach, a linked data model can allow for data storage in a distributed environment while reducing or minimizing aspects of the overhead required by conventional database structures. A defining characteristic of the linked data approach is to make the data items available as a series of documents, such as HTTP documents, where documents embed links to other documents. This approach can be similar to the model used for providing documents on wide area distributed networks. However, implementing this type of approach can require overcoming obstacles related to how the various interlinked data items are created and/or maintained. In various aspects, the creation and maintenance of the various interlinked data items can be achieved using a Linked Data Processor or another type of component (or components) having the features described herein. A Linked Data Processor can be a component (or components) that implements a set of rules based on a desired business logic (i.e., a desired set of relationships between data items), with the links between the documents capturing the semantics of the business logic. A Linked Data Processor or another similar type of component can allow applications to deliver rich data access directly against raw storage without introducing a secondary durable database technology. Examples of applications that can benefit from using a Linked Data Processor to allow for data storage using a linked data model can include e-commerce applications and on-line banking.

The business logic of an application can be dependent on and/or closely coupled to the durable data store used for data storage. Conventional methods for developing business logic for an application have typically made use of either traditional relational database technology or alternatively document style databases, with the application business logic being tightly coupled to the chosen database. However, because both of these styles of databases rely on a central compute function being available at data access time, such databases can be limited in their ability to make effective use of distributed computing environments, including distributed storage infrastructure.

Instead of relying on a central compute function, in various aspects query overhead at data access time can be reduced or minimized by pre-computing results and keeping them available in storage as data items (such as documents) with distinct addresses. The pre-computed results can include results for any convenient number of queries, such as results for queries that have a threshold frequency of being submitted or queries that correspond to selected business logic. In some alternative aspects, all valid queries that can be submitted for available data can be determined and pre-computed for storage as distinct documents or data items. In place of a developer writing queries (for a conventional database model) that get executed as user requests are made, the developer instead can write declarative rules that are processed by a Linked Data Processor during the initial loading and storage of data as one or more data items or documents. The overall data set is modeled as a graph and the developer writes rules that determine how the overall data set is split up into inter-linked data items.

When a new set of input data is posted into the system, the Linked Data Processor can execute a series of rules iteratively to determine which of the current resources need to be loaded into the processor's main memory in order to process the new data items. Some of these resources may be needed for reference data as part of the processing of the new data items while other resources can end up being modified to incorporate new links and/or data item(s).

The set of rules for determining how to add new data items to existing resources can correspond to data provided to the Linked Data Processor, as opposed to the rules being part of the source code of the infrastructure itself. This can allow the set of rules to be customized to implement a desired business logic for storing data items. A Linked Data Processor can serve as an application platform that provides the infrastructure for processing data items to form linked documents by hosting the set of rules that implement the desired business logic.

In various aspects, the documents stored as linked data can be modeled as nodes in a graph model. Adopting a graph model for the documents can allow the Linked Data Processor to merge and split the data in any convenient manner. In particular, the documents within a linked group of documents can be divided into a plurality of resource groups, so that the linked group of documents can be saved in durable storage without requiring an entire linked group to be saved in a single storage area. Superficially the Linked Data Processor may appear to resemble a traditional message processing pipeline. However in contrast with traditional message processing pipeline architectures the Linked Data Processor can merge data.

The Linked Data Processor may also appear to resemble a database system. However, unlike a traditional database system, the Linked Data Processor can reduce or minimize compute overhead at data access time. In a traditional database the query is the dominant activity that consumes computing resources. By contrast, with the Linked Data Processor, to the degree a traditional database "query" requiring translation to storage semantics may exist, the computing time for processing the "query" has been effectively moved to insert time.

Addition of Data Items: Graph Store, Resource Determination, and Resource Creation In various aspects, addition of a data item to a data set can start by creating and/or obtaining one or more data items suitable for addition to a data set. The creation of the data items can be based on the underlying business logic for a data set. This can be similar to a specification of a value for a field in a conventional multi-dimensional database. The party creating the data item can be aware of the types of data items stored in a data set, and the taxonomy or semantics used for organizing the data set. For example, for items related to banking transactions, each data item may correspond to a separate addition or subtraction to an account, along with a time stamp for when the transaction occurred. For data items for an e-commerce site, each data item may correspond to products or services for sale, various pre-defined fields containing information about the product or service for sale (such as price, brand, images of the product, particular features), or a combination thereof. For data items related to software application versions and/or updates, each data item can correspond to a version of a package (a portion of the application), various pre-defined fields containing information about a version of a package, or a combination thereof.

After creation of one or more data items suitable for addition to a data set based on the semantics of the data set, a graph format representation of the data items can be created to serve as input data for incorporating the data items as resources in durable storage. A graph can be a generic and expressive data model, making it suitable for representing a variety of types of data relationships. Because the data items are created with knowledge of the semantics (representing the underlying business logic) of the data set, the relation of a data item to the existing stored resources can be described based on statements that explain the relationship of a data item to the existing resources. It is noted that specifying the relation of a data item to existing stored resources can include replacement of a resource, such as by specifying that all links previously involving a prior resource can be transferred or modified to link to a resource corresponding to the new data item. Alternatively, in a replacement situation, links to a prior resource can be maintained, but simply indicated as not being current. Such a resource replacement can also be used as a method for modifying or updating the content of a resource.

An example of a suitable graph format for input data for a Linked Data Processor is the Resource Description Framework (RDF) model for specifying a graph. Specifying graph relationships using an RDF model can serialize a graph as a series of triples, where each triple denotes the relationship between two nodes in the data set. Various technologies are available for translation of data into a graph representation. For example, if the input data is in the form of an XML document, the data can be translated with a conventional XSLT transform into an RDFXML format. Similarly if the original data is in the form of a JSON (Javascript Object Notation) document, applying a conventional JSON-LD context allows the JSON to be read as RDF triples.

After creation of data items having a corresponding suitable graph format to serve as input data, the data items can then be incorporated into the Linked Data Storage. During a given pipeline instance for incorporation of input data, various data structures can be stored in the memory for a Linked Data Processor (or other components with suitable functionality). A pipeline instance refers to all of the processing that occurs with respect to a given set of input data (whether batched or single). Depending on the aspect, a separate pipeline instance can be initiated for each data item in a set of input data; or a single pipeline instance can handle all data items received as part of a set of input data; or data items from a set of Input data can be handled in any other convenient manner by one or more pipeline instances.

The in-memory data structures used during a given pipeline instance can include a Graph Store and a Resource List. The Graph Store represents the portion of the graph representation(s) of the linked data set that are stored in memory. When input data is received, the Graph Store can correspond to a graph representation of the content of the input data. The Resource List is a corresponding list of all of the resources that are currently represented by the Graph Store.

In addition to the Graph Store and Resource List, the Linked Data Processor can also have in-memory data structures corresponding to a Deduced Resource List and a Missing Resource List. The Deduced Resource List can be generated by executing a set of rules against the documents represented in the graph representation in the in-memory Graph Store. The rules for generating the Deduced Resource List can be referred to as Resource Determination Rules. When new data items are provided as input data, the initial graph representation in a Graph Store can correspond to the data items referenced in the input data. In order to incorporate the input data as part of one or more complete data sets, the Resource Determination Rules can be used to determine one or more resources (each resource corresponding to one or more linked documents) from durable storage that are related to the input data. Optionally, the Graph Store can also be updated at this time so that the graph representation in memory has nodes corresponding to the additional documents in the Deduced Resource List. Alternatively, the updating of the Graph Store can occur at a later time, such as during retrieval of resources from durable storage based on the Missing Resource List.

The Missing Resource List can be derived by comparing what is in the Resource List and what is in the Deduced Resource List (for example, based on any documents present in the Deduced Resource List but absent from the Resource List). The data items named in the Missing Resource List can then be loaded, which also causes the data items to be added to the Resource List. This process can loop until the Missing Resource list is determined to be empty. The resulting Resource List can contain a list of all the data items that are represented in the Graph Store.

At this point, the Graph Store can be used to save the data items as one or more resources into the durable storage. The combination of the saved resources can correspond to all data items represented in the Graph Store and/or the Resource List. This process can be based on a set of Resource Creation Rules, which can represent a list of naming rules. Each name can represent the named content of one particular type of resource. The act of saving can include applying the Resource Creation Rules to the Graph Store, optionally translating the resulting graph into another format (such as XML or JSON), and saving (including possibly overwriting) a resource in storage.

In some aspects, the Resource Determination Rules can be simplified by having all links between data items correspond to "doubled links", in the sense that every forward link between two data items can also have a corresponding back link between those same two data items. This can facilitate identifying data items for the Graph Store, as it allows a link in a graph representation to be traversed in either direction during resource determination.

Example of Updates to Graph Representation in Graph Store

Figure 4:
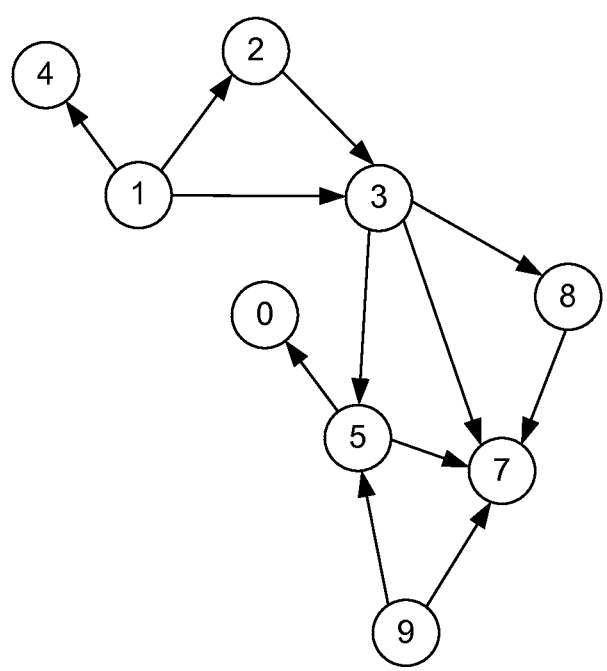
FIG. 4 shows an example of a graph representation of data stored according to a linked data model.

The following example illustrates the nature of adding data items to a graph representation corresponding to a linked data structure in various aspects. FIG. 4 illustrates an example of a graph representation of data items as saved to durable storage prior to addition of new input data. Of course, the graph representation in FIG. 4 can correspond to a graph representation of a portion of a larger data set. Alternatively, FIG. 4 can be viewed as a small-scale version of a complete data set, with the understanding that any convenient number of additional data items/documents could be linked together.

Figure 5:
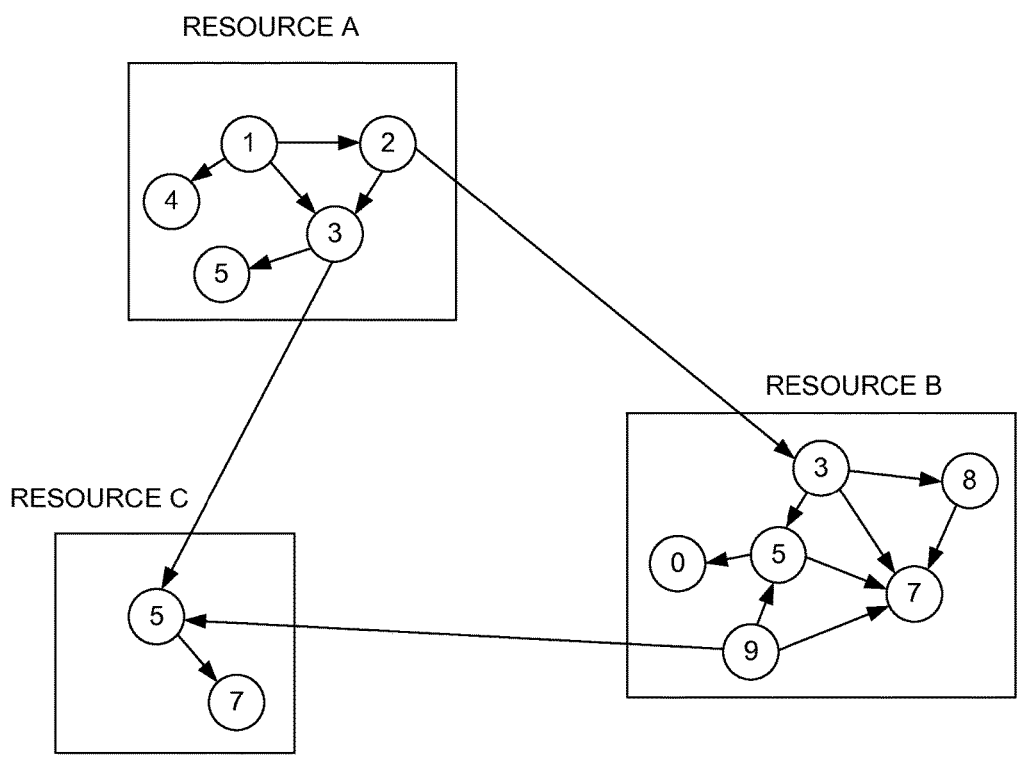
FIG. 5 shows examples of graph representations of data stored as separate resources according to a linked data model.
Figure 6:
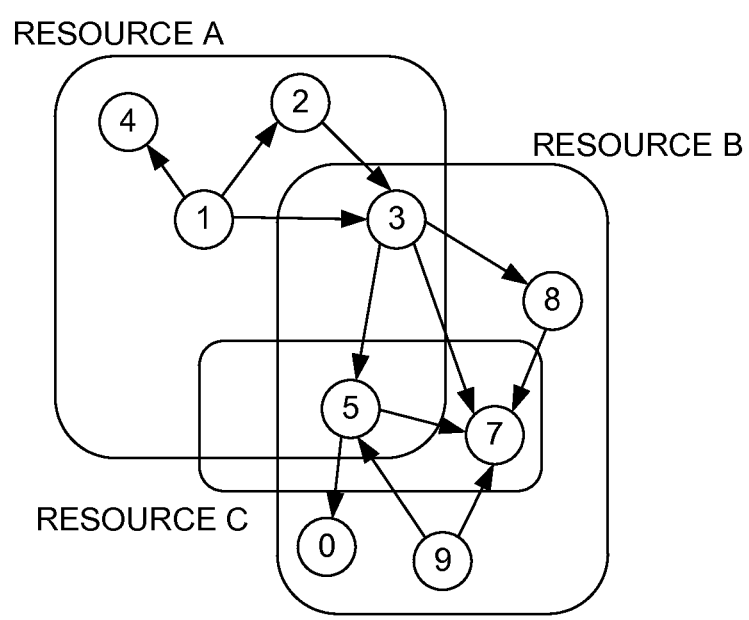
FIG. 6 shows an example of a graph representation corresponding to combining the resources in FIG. 5 to form the graph representation in FIG. 4.

FIG. 5 shows an example of graph representations for portions of the data items/documents in FIG. 4. The graph representations or resources A, B, and C in FIG. 5 represent an example of how data items represented in a single linked graph may be split up or divided for saving in various durable storage locations. As shown in FIG. 5, resource A includes data items 1 through 5, resource B includes data items 0, 3, 5, 7, 8, and 9, and resource C includes data items 5 and 7. Thus, as shown in FIG. 5, the larger graph representation shown in FIG. 4 can be broken up into a plurality of graph data structures or resources for storage in durable storage. In the example shown in FIG. 5, the resources represent the physical storage of the graph and they represent the physical access external clients have to the data. It is noted that data items may be duplicated across resources. There will be no confusion when the resources are pulled back into memory as the RDF data model consists of a series of assertions. Asserting something for a second time is simply ignored. This characteristic of RDF data sets is why RDF data sets can be so easily be merged in memory. FIG. 6 schematically shows the merger of the several resources (A, B, and C) in FIG. 5 into a single larger graph representation in memory. The fact that some data items are pulled into memory twice (or multiple times) to assemble the larger graph representation is not a problem, since the duplicate data items across resources simply represent repeating the same data-based assertion a second time. As would be expected, assembling the resources as shown in FIG. 6 from the various graph representations in FIG. 5 results in a graph representation that is the same as the original graph representation shown in FIG. 4.

Figure 7:
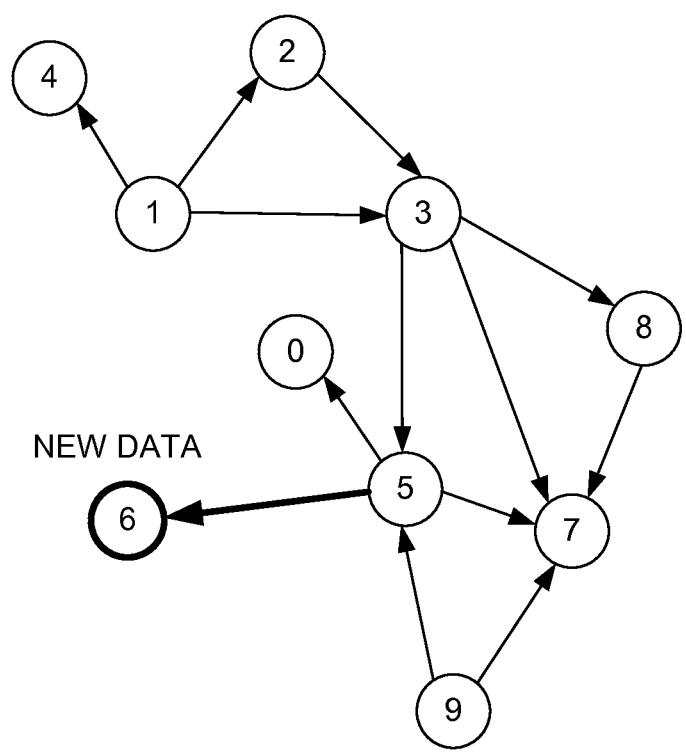
FIG. 7 shows an example of a graph representation for addition of a data item according to a linked data model.
Figure 8:
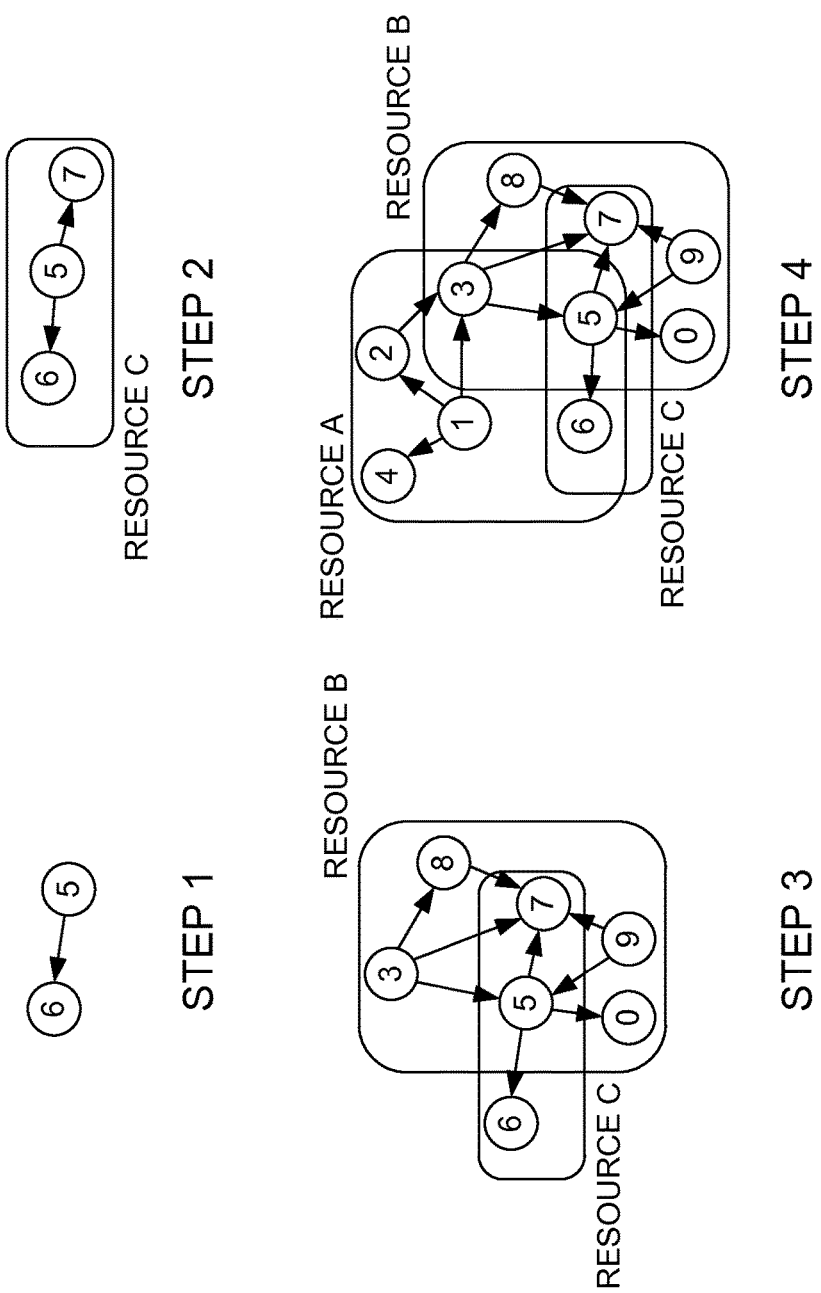
FIG. 8 shows an example of a graph representation based on applying resource determination rules to a graph representation to load resources during addition of a data item according to an aspect described herein.

FIG. 7 illustrates an example of a desired addition of a data item to the graph data set. As shown in FIG. 7, the desired addition of new data corresponds to a new data item (number 6) that is linked to data item number 5. In order to update the graph representation, all of the instances of data item 5 in durable storage can be pulled or loaded into memory. The "load" phase of the processing can correspond to a loop that repeatedly re-evaluates the current state of the Graph Store. This has the effect of incrementally growing the in memory image as resources are iteratively pulled into memory (this process continues until the Missing Resource list resolves to empty.) This stepwise growth of the in-memory Graph Store is shown in FIG. 8.

Figure 9:
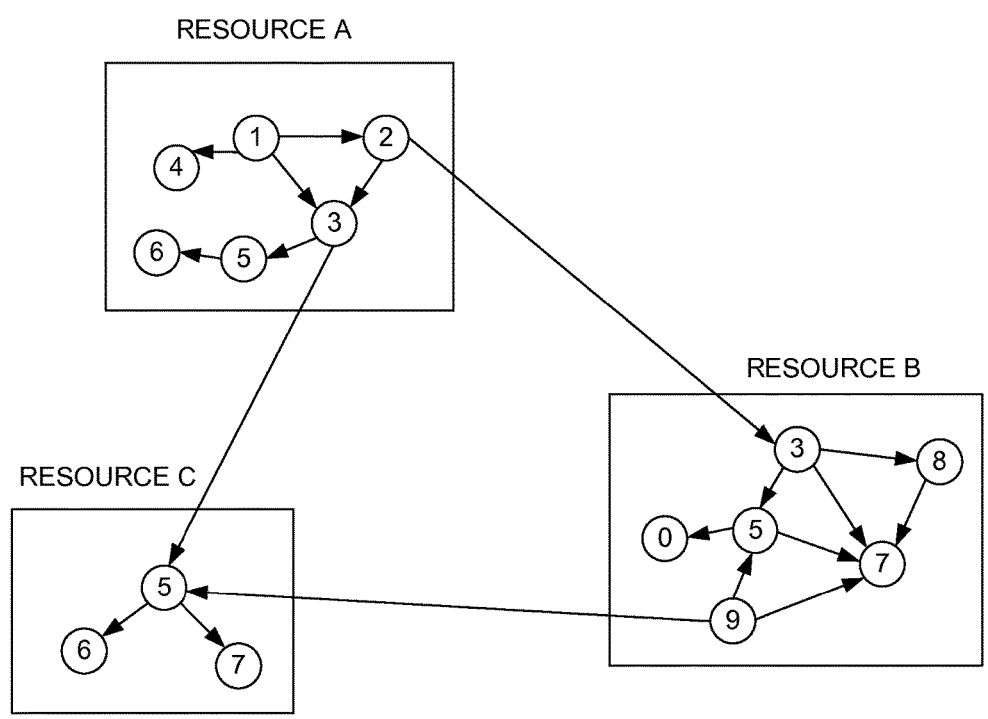
FIG. 9 shows examples of graph representations of resources created by applying resource creation rules to a graph representation during saving of data items to durable storage according to an aspect described herein.

After finishing loading of all of the resources, any updates to data item 5 can be implemented, such as updating the links in data item 5 to reflect new data item 6. Alternatively, such changes to an existing data item that result from new input data can be made at any other convenient time. Following the stepwise "load" process and any updates/changes to existing data items, the resources corresponding to the Graph Store can be written back to durable storage. This is shown in FIG. 9. As shown in FIG. 9, based on the business logic used for determining what portions of the data set to save together, data item 6 is included with resources A and C when saved to durable storage, but not resource B.

It is noted that a characteristic of how a Linked Data Processor operates is that it facilitates batching or batch processing of new input data. In the linked data model each data item is given a distinct name. Because different unrelated input data packets all contain data items with distinct names, even unrelated data can be merged into the same Graph Store in memory without the potential for confusion.

Example of System and Method for Processing of Linked Data

An example of a Linked Data Processor's place in an overall architecture for managing a collection of data items stored as resources is shown in FIG. 1. In the example configuration shown in FIG. 1, resources 150 (each containing a plurality of data items) are stored in the durable storage 155 used by the system. The durable storage can correspond to any convenient type of durable storage, such as storage for a distributed computing or processing environment. Examples of durable storage can include, but are not limited to, magnetic disks, optical disks, solid state memory, or any other convenient type of storage device.

In addition to durable storage, the Linked Data Processor 120 can also use memory (such as one or more associated memories) to collect a portion (or portions) of a data set in an in-memory state. A portion of a data set (such as a resource) can be stored in an in-memory state that lasts for the duration of the processing of a set of input data 110, such as a set of input data 110 received or posted 107 via a network 101. In the example shown in FIG. 1, the in-memory state can include two distinct data structures. One data structure can correspond to a graph store 123, while a second data structure can correspond to a resource list 127. During operation, the Linked Data Processor 120 can receive input data 110 from an input queue 105 for incorporation into the graph store 123 representation (based on a linked data model) and saving as part of the resources 150 saved in durable storage 155. Once resources 150 are saved in durable storage 155, the data items within the resources 150 and/or the resources themselves can be retrieved 106 from durable storage based on the distinct name assigned to each data item and/or by traversing the linked nature of the data items within the resources. Optionally, a content delivery network 158 can assist with managing the resources 150 in durable storage 155 by retrieving data items that match requests and/or by caching predefined results. Caching of results for certain requests, such as requests that are expected to have a high frequency, can facilitate additional improvements in the speed for retrieval of data from the durable storage 155. For example, one or more initial requests can be used to identify data items from durable storage 155 that match the requests. The identified data items can be saved in a cache of content delivery network 158.

A Linked Data Processor (or other components) can maintain a data set that is distributed across one or more resources held in distributed storage technology, such as a plurality of resources. One aspect of a linked data model that can assist within maintaining a data set is the use of identifiers that are associated with the data items in a data set at the finest level of granularity. This means that data items within a resource are addressable and/or retrievable in a substantially constant time independent of the scale of the data set. Following this model the Linked Data Processor has the ability to read and write any of the data items and/or corresponding resources it has previously created.

Figure 2:
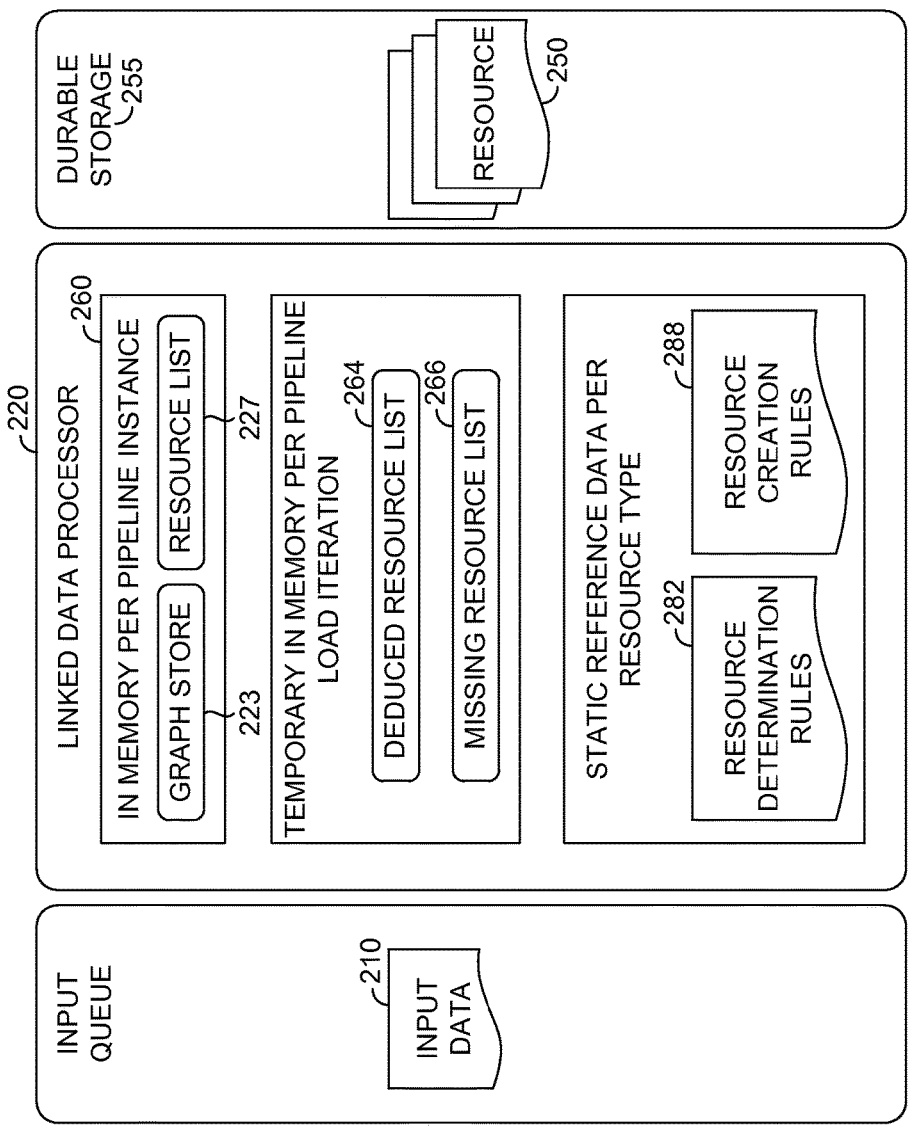
FIG. 2 schematically shows an example of a system for saving and loading data in a distributed computing environment using a linked data model.

FIG. 2 schematically shows additional details of an example of a Linked Data Processor. In the example shown in FIG. 2, various data structures can be stored in memory for the Linked Data Processor 220 during a given pipeline processing instance. The in-memory data structures can include a graph Store 223 and a resource List 227. FIG. 2 refers to the lifetime of these in-memory data structures as corresponding to a pipeline instance 260. A pipeline instance 260 refers to all of the processing that occurs with respect to a given set of Input data 210 (whether batched or single). Depending on the aspect, a separate pipeline instance can be initiated for each data item in a set of input data 210; or a single pipeline instance can handle all data items received as part of a set of Input data; or data items from a set of Input data can be handled in any other convenient manner by one or more pipeline instances.

In the example shown in FIG. 2, the Linked Data Processor 220 can also make use of two additional in-memory data structures, the lifetime of which is limited to the "load" phase of the processing. These additional data structures can correspond to a deduced resource list 264 and a missing resource list 266. As described above, the deduced resource list 264 can be generated by executing a set of rules against the documents represented in the graph representation in the in-memory graph store 223. The rules for generating the deduced resource list 264 can be referred to as resource determination rules 282. Also as described above, missing resource list 266 can be determined based on the differences between the resource list 227 and deduced resource list 264 after applying the resource determination rules 282. After all data items are loaded/updated and the graph representation in the graph store 223 is complete, resource creation rules 288 can be used to store the data items represented in graph store 223 as one or more resources 250 in durable storage 255.

Figure 3:
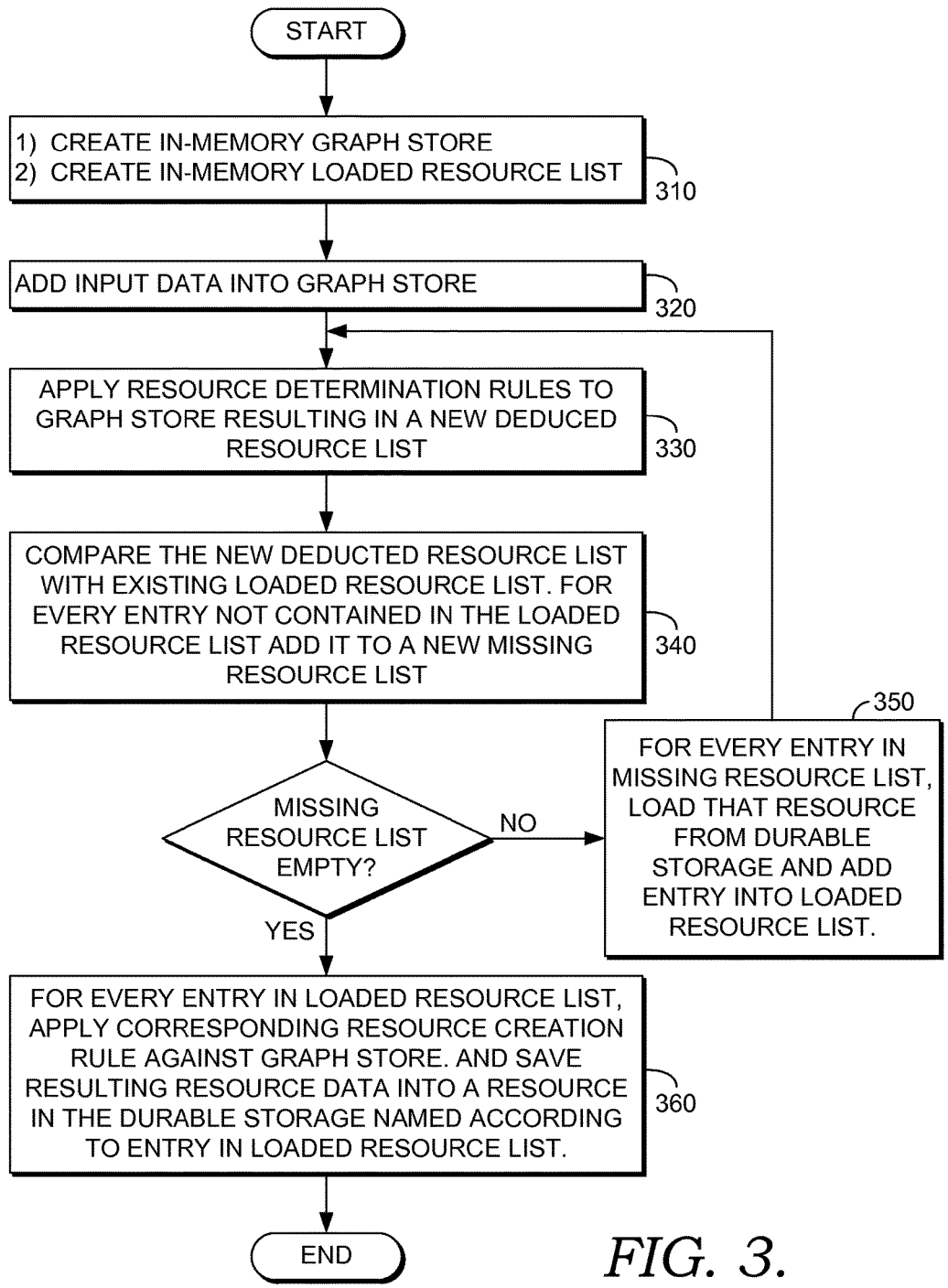
FIG. 3 shows an example of a process flow for saving data according to an aspect described herein.

During operation of a Linked Data Processor 220 as shown in FIG. 2, when new input data is detected in an input queue, a new pipeline instance can be started. The new pipeline instance can be started by creating 310 an in-memory graph store and an in-memory loaded resource, as shown in FIG. 3. The input data can then be added 320 to the in-memory graph store. Resource determination rules can then be applied 330 to the graph store to generate a new or updated deduced resource list. The new or updated deduced resource list can then be compared 340 with a loaded resource list of existing resources in memory. For entries not found in the loaded resource list, a corresponding entry can be added to the missing resource list. When the missing resource list contains resources (such as missing data items), the corresponding resources and/or data items can be loaded 350 into memory from durable storage. This process can iterate until the missing resource list is empty. After the missing resource list is empty, all resources necessary for updating the data set based on the new input data are in memory. The various data items can be updated (if the update has not been performed at an earlier stage), and the in memory data items can then be saved to durable storage. This can be performed, for example, by applying 360 resource creation rules to the data items in memory to save the data items as resources across one or more storage areas in the durable storage.

Example 1: E-Commerce Catalog

In this example, a data tree based on a linked data model as described herein can be used to support a database for an e-commerce site. An e-commerce site may offer a variety of goods and services to consumers. A camera is an example of a good that might be offered. In this example, camera features corresponding to brand, price, type of zoom, and memory will be used to illustrate operation of a database based on a linked data model as described herein, but it is understood that any convenient number or type of features could be used.

Figure 13:
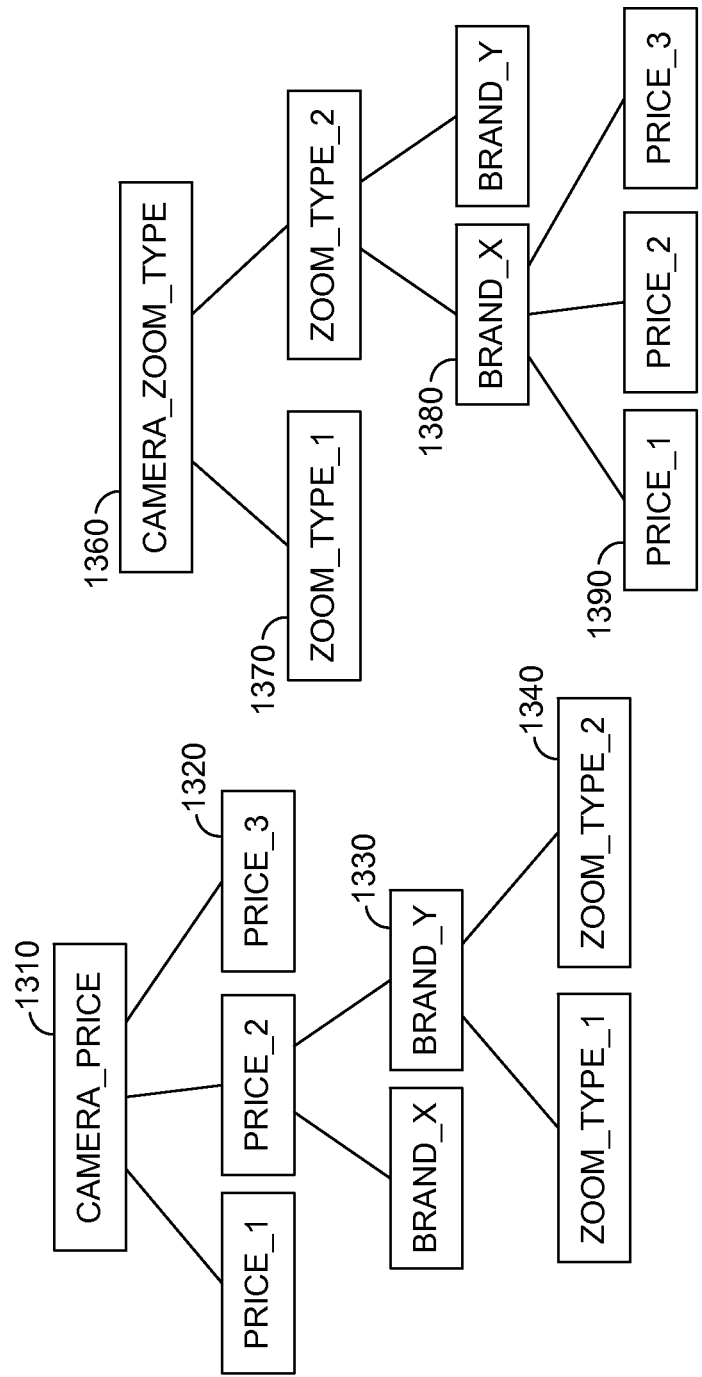
FIG. 13 shows examples of graph representations of data trees applied in an e-commerce setting according to an aspect described herein.

Based on prior business history, it is assumed in this example that consumers initiate searches for cameras on the e-commerce site either based on price and brand, or based on features such as type of zoom. After starting a search, a user may further refine the search based on any factor, such as price, brand, or one or more features. Based on this business logic, a plurality separate data trees can used to store data items related to the cameras. Schematic examples of two data trees are shown in FIG. 13. In the data trees, the nodes in a sub-layer are shown for only one node in the prior layer for ease of viewing. In FIG. 13, the first data tree has a root node 1310 of camera_price. For the camera_price data tree, the second layer of nodes 1320 corresponds to various price ranges. The third layer of nodes 1330 corresponds to various brands within each price range. The fourth layer of nodes 1340 corresponds to the type of zoom. In this example, each node can represent a separate document that can be accessed by a user that starts a search based on the price of cameras, and then subsequently refines the search. Alternatively, this data tree could also be suitable for a search specifying both price and brand initially. The second data tree in FIG. 13 has a root node 1360 of camera_zoomtype. The second layer of nodes 1370 corresponds to various types of zoom. The third layer of nodes 1380 corresponds to various brands, while the fourth layer of nodes 1390 corresponds to various prices.

The data trees in FIG. 13 can represent individual resources stored in durable storage for access as a user searches for cameras. Of course, any other convenient number of data trees similar to those in FIG. 13 could also be pre-generated based either on expected searches or on all possible searches that are feasible on the e-commerce site.

Figure 14:
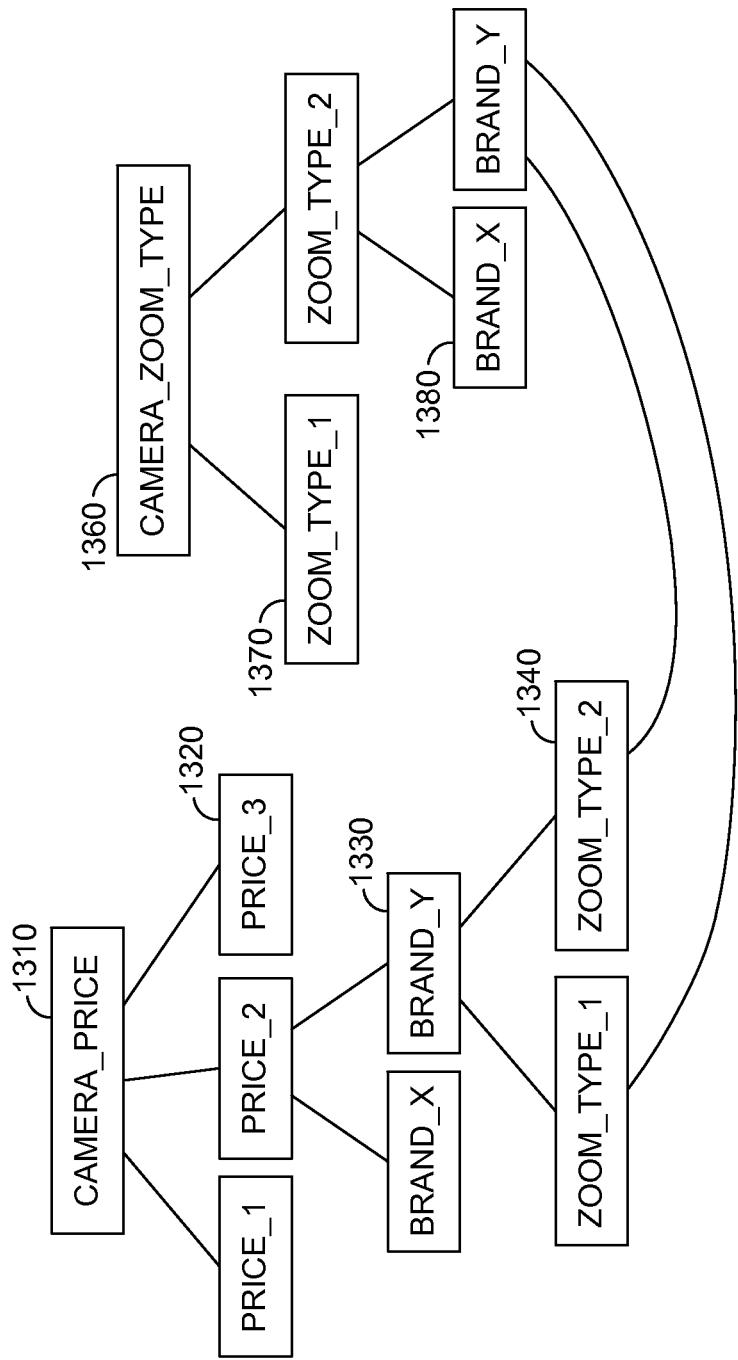
FIG. 14 shows examples of graph representations of data trees applied in an e-commerce setting according to an aspect described herein.

The two resources shown in FIG. 13 correspond to resources that are part of a larger data graph, as shown in FIG. 14. In FIG. 14, the two resources from FIG. 13 are shown. However, instead of representing the fourth level of camera_price nodes 1440 and the fourth level of camera_zoomtype nodes 1490 separately, a single level of fourth level nodes 1445 is shown. This represents the concept that the content of the documents corresponding to the two fourth level nodes is the same. When saved to durable storage, separate copies of fourth level nodes 1445 can be saved out as shown in FIG. 13. Of course, if additional features and/or data trees were represented, additional opportunities for linking between data trees could also be observed.

It is noted that in this example, each node was limited to a single feature. Of course, nodes could correspond to any convenient number of features. Additionally, in this example each node is represented as both a node for linking to other levels and as a node for containing underlying data. In other aspects, separate data items can be used for linking between levels in a data tree and acting as containers for underlying data.

Example 2: Append-Only Database

An append-only database is a database where only insert operations are permitted. No in-place updates or actual deletes are permitted. Instead updates and deletes are modelled as inserts of new "versions" of a particular data item. Append-only structures can be implemented against many different kinds of database. For example, in the banking business, following an append-only model in the relational database design has long been a widely adopted best-practice as it naturally builds audit trails into the core business models themselves.

In this example, a linked data model as described herein can provide an append-only database. To implement an append-only database as a linked data model, the data items can be arranged as an append-only tree. Being append-only, the tree structure is also naturally ordered. As an example, an implementation of an append-only database using a linked data model can limit the structure to a small plurality of levels, such as three levels. In the example of a three level data tree, the data tree can include a root "index" data item and then a second level of numbered linking data items: "page-0", "page-1", "page-2" etc. and then finally the data items containing the actual data forming the third "leaf-node" level. In this type of tree structure, the root index page (document) contains links to each of the "n" page nodes, and each page node contains links to each data "leaf node" in the final level containing the data.

To write data in this type of data structure, a new data "leaf-node" can be created for each new data item and the page (second level) with the highest number can be re-written to include this additional link. If a size threshold for the number of links included in the second level page node, instead of re-writing the current highest page, a new page can be started. Any convenient number of links could be used for the size threshold, such as at least 100, or at least 1000, or any other convenient value. When a new page node is created, the root index resource is re-written to include it. In some aspects, one method for maintaining consistency during additions to the tree structure can be to update the tree structure in the order of leaf node first, page node next and root index last.

One application for an append-only type database can be a database where it is desirable to access data within the database based on timestamps. In this type of aspect, timestamps corresponding to every link in the data tree can be written directly into the root index and page node resources. Writing timestamps against all the internal links in the data tree can allow for efficiency in a processing agent that wants to read from the tree and process data based on a comparison with a saved timestamp. For example, by saving the timestamp of when the processing agent last processed the data tree structure, the processing agent can traverse the tree from the root by only following links that have an associated timestamp greater than the saved timestamp value. Such a traversal can reduce the number of data load operations required to determine or identify updates to the data represented by a data tree.

In this type of example, the append-only data tree may be thought of as acting as a durable queue, with one or more saved timestamps of the processing agent acting as a durable cursor. One difference between an append-only database based on a linked data structure as described herein relative to a typical durable queuing product is that the queue (append-only linked data structure) is simply a set of static resources with the queue semantics (such as timestamps) embedded in the agents that write and read from this set of resources.

Example 3: Software Package Metadata

This example describes use of a tree structure based on a linked data model for representation of software package metadata. A conventional approach to delivering software is to model the various components of a system as packages with dependencies on other packages. In the packaging system described in this example, software packages can have associated version numbers. Distinct versions of a package can include different dependencies, and these dependencies can be expressed in terms of allowed version ranges. Version ranges can be used rather than specific versions to allow the client installation agent some flexibility in terms of what particular version of a package it chooses to use. For example, the installation agent may be constrained to resolve dependencies such that only a single version of a particular package type is allowed in the installation.

Using a conventional database, the constraint resolution process can become involved and may require use of various algorithms. This constraint resolution process can require having a significant amount of metadata available to describe all these various packages, their available versions and their various dependencies.

In an aspect, a tree structure based on a linked data model as described herein can be used instead of a traditional database for managing software packaging metadata. In this type of aspect, when a new package version is added to a catalog of package versions, the resources associated with that package can be updated. There may be many version of a particular package, such as hundreds of versions. Representing the versions of a package as a tree of resources therefore can be beneficial.

In this example, when writing new data into the package catalog, all of the resources that describe all the versions of a particular package type can be loaded into memory. This can be implemented, for example, by a full traversal of the data tree associated with a particular package type. The full traversal of the tree pulls all the resources into the in-memory database. At this point, the new package version information can be added. Saving the database is a matter of reconstituting the tree of data items or resources for each package type. For example, the in-memory database can be queried for the list of packages. For each package in the list of packages, the list of versions for the package can be gathered and then each version can be saved as an individual data tree with a root item corresponding to the package type.

As an example using a tree structure that is three levels deep, in addition to the root data item, the middle "page" nodes can be determined by version range. For example consider a package with versions 1.0, 1.1, 1.2, 2.0, 3.0, 4.1, 6.0, 7.0, 7.1, 7.2, 8.0, 9.0, 11.0, 12.0. In such an example, the pages can be split into pages tagged with the ranges [1.0-2.0], [3.0-8.0], [9.0-12.0] where each range page has, in turn, links to the individual version resources. Of course, any other convenient selection of page ranges for splitting the pages could also be used.

When a client agent accesses the data in the tree structure, the client agent may not want to have to load all of the information about all the different versions of a package. Instead, the client agent may only be interested in a particular range of versions. In this type of example, a client agent may be interested in a range of versions [4.1-7.2], in which case the page [3.0-8.0] is the only page it requires. In this type of example, a client agent can traverse the tree of data items comparing the various page nodes with the range of interest. Based on this comparison, the client agent can determine the matching [3.0-8.0] page, and avoid traversing the other page nodes. Once all the relevant resources are loaded and merged into the in-memory database, the client agent can then proceed with the more involved business logic of determining which version of the package is most appropriate in a particular context.

Additional Examples

For purposes of a detailed discussion below, embodiments are described with reference to components supported by a cloud computing platform. However, the operations described herein can be performed in different types of operating environments having alternate configurations of the functional components described herein. As such, the embodiments described herein are merely exemplary, and it is contemplated that the techniques may be extended to other implementation contexts.

Figure 10:
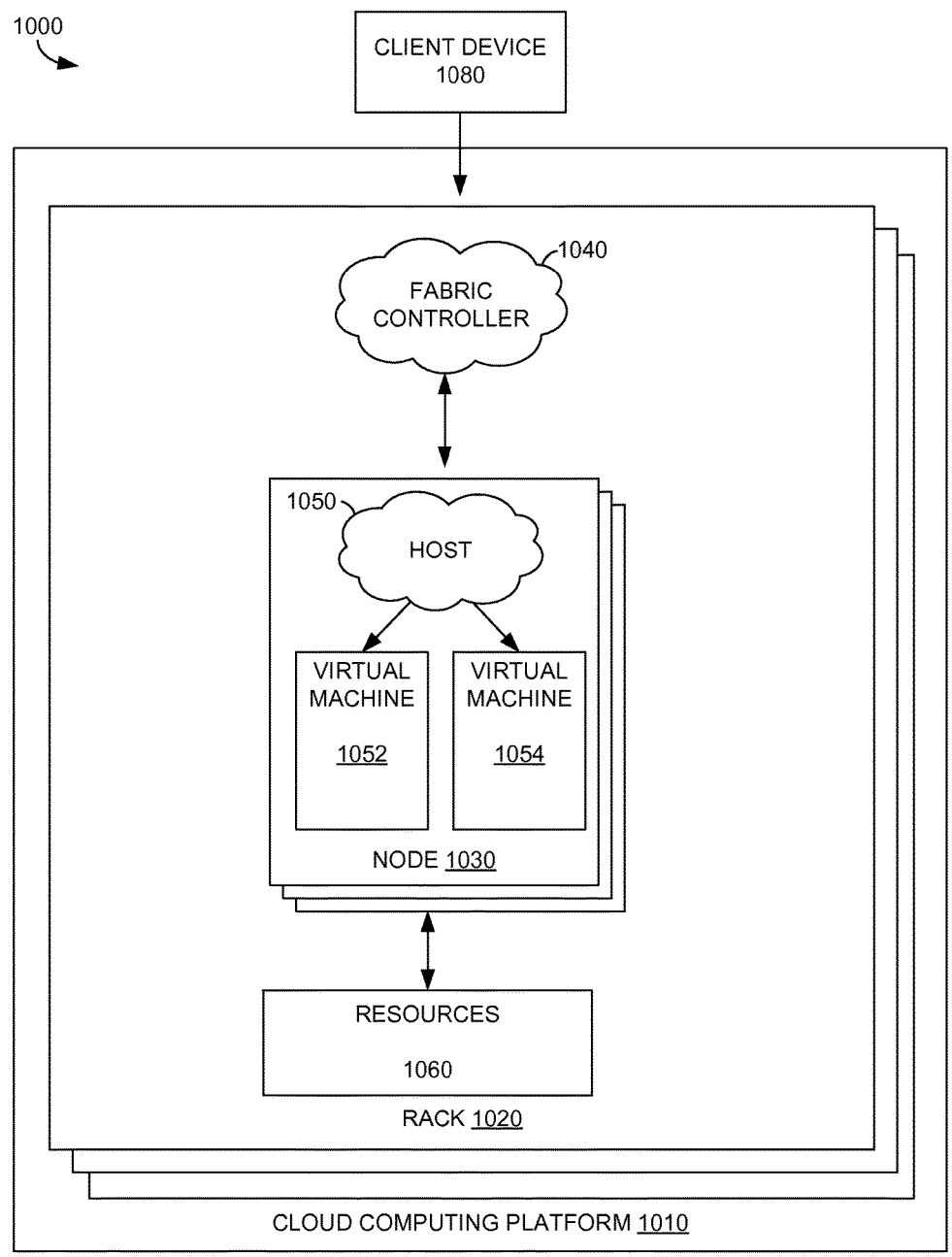
FIG. 10 is a block diagram of an exemplary distributed storage system that is suitable for use with various aspects described herein.

FIG. 10 illustrates an exemplary distributed computing environment 1000 in which implementations of the present disclosure may be employed. In particular, FIG. 10 shows a high level architecture of a cloud computing platform 1010 suitable for implementing data storage using a Linked Data Processor as described in various aspects herein and as further exemplified in FIGS. 1 and 2. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 1000 that includes the cloud computing platform 1010, rack 1020, and node 1030 (e.g., computing devices, processing units, or blades) in rack 1020. A Linked Data Processor, such as the Linked Data Processor shown in FIG. 1 or 2, can be implemented with a cloud computing platform 1010 that runs cloud services across different data centers and geographic regions. The cloud computing platform 1010 can implement a fabric controller 1040 component for provisioning and managing resource allocation, deployment, upgrade, and management of cloud services. Typically, the cloud computing platform 1010 acts to store data or run service applications in a distributed manner. The cloud computing infrastructure 1010 in a data center can be configured to host and support operation of endpoints of a particular service application. The cloud computing infrastructure 1010 may be a public cloud, a private cloud, or a dedicated cloud.

The node 1030 can be provisioned with a host 1050 (e.g., operating system or runtime environment) running a defined software stack on the node 1030. Node 1030 can also be configured to perform specialized functionality (e.g., compute nodes or storage nodes) within the cloud computing platform 1010. The node 1030 is allocated to run one or more portions of a service application of a tenant. A tenant can refer to a customer utilizing resources of the cloud computing platform 1010. Service application components of the cloud computing platform 1010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 1030, the nodes may be partitioned into virtual machines (e.g., virtual machine 1052 and virtual machine 1054). Physical machines can also concurrently run separate service applications. The virtual machines or physical machines can be configured as individualized computing environments that are supported by resources 1060 (e.g., hardware resources and software resources) in the cloud computing platform 1010. It is contemplated that resources can be configured for specific service applications. Further, each service application may be divided into functional portions such that each functional portion is able to run on a separate virtual machine. In the cloud computing platform 1010, multiple servers may be used to run service applications and perform data storage operations in a cluster. In particular, the servers may perform data operations independently but exposed as a single device referred to as a cluster. Each server in the cluster can be implemented as a node.

Client device 1080 may be linked to a service application in the cloud computing platform 1010. The client device 1080 may be any type of computing device. The client device 1080 can be configured to issue commands to cloud computing platform 1010. In embodiments, client device 1080 may communicate with service applications through a virtual Internet Protocol (IP) and load balancer or other means that directs communication requests to designated endpoints in the cloud computing platform 1010. The components of cloud computing platform 1010 may communicate with each other over a network (not shown), which may include, without limitation, one or more local area networks (LANs) and/or wide area networks (WANs).

Having described various aspects of the distributed computing environment 1000 and cloud computing platform 1010, it is noted that any number of components may be employed to achieve the desired functionality within the scope of the present disclosure. Although the various components of FIG. 10 are shown with lines for the sake of clarity, in reality, delineating various components is not so clear, and metaphorically, the lines may more accurately be grey or fuzzy. Further, although some components of FIG. 10 are depicted as single components, the depictions are exemplary in nature and in number and are not to be construed as limiting for all implementations of the present disclosure.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to a Linked Data Processor (such as Linked Data Processor 120 or Linked Data Processor 220), may be carried out by a processor executing instructions stored in memory.

In various aspects, the systems and methods provided herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network. The various types of systems can generally include one or more types of memory or other physical storage, one or more processors (including storage associated with the processor, which may be the same or different from the one or more types of memory or other physical storage), and other typical components of a computing environment, such as one or more presentation components, input/output (I/O) ports, and I/O components. Distinction is not made between such categories as "workstation," "server," "laptop," "handheld device," etc., when referring to a "computer" or "computing device."

A computing device and/or a distributed computing environment typically includes a variety of computer-readable media. Computer-readable media can be any available media that can be accessed by a computing device and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media is defined herein as excluding propagated data signals. In an aspect, computer storage media can comprise tangible computer storage media.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory can include computer storage media in the form of volatile and/or nonvolatile memory. The memory may be removable, nonremovable, or a combination thereof. Exemplary memory includes solid-state memory, hard drives, optical-disc drives, etc.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device. The computing device may be equipped with depth cameras, such as, stereoscopic camera systems, infrared camera systems, RGB camera systems, and combinations of these for gesture detection and recognition. Additionally, the computing device may be equipped with accelerometers or gyroscopes that enable detection of motion. The output of the accelerometers or gyroscopes may be provided to the display of the computing device to render immersive augmented reality or virtual reality.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Figure 11:
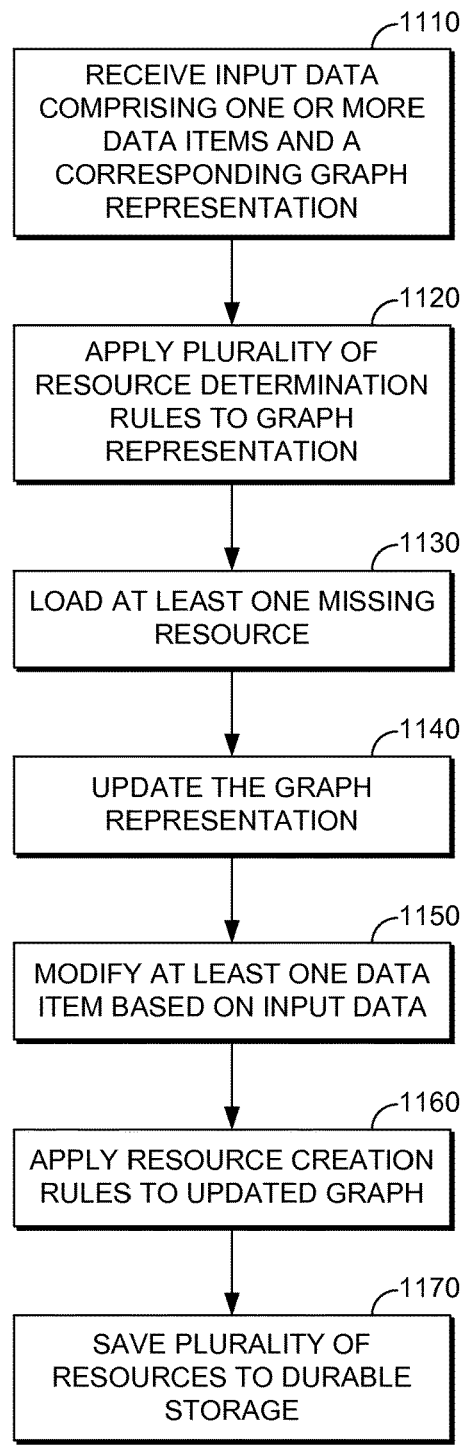
FIG. 11 shows an example of a process flow according to an aspect described herein.

FIG. 11 shows an example of a method for storing data in a distributed storage environment according to various aspects described herein. In the example shown in FIG. 11, input data is received 1110 that comprises one or more received data items and a corresponding graph representation. The graph representation can include a representation of the one or more data items in a tree format. The graph representation can also include a representation of at least one link between a first data item from the one or more received data items and second data item from a resource saved in durable storage. A plurality of resource determination rules can be applied 1120 to the graph representation to identify at least one missing resource. The at least one missing resource can comprise a plurality of stored data items, the plurality of stored data items including the second data item. At least one missing resource can then be loaded 1130. The graph representation can be updated 1140 to include a representation of the plurality of stored data items of the at least one missing resource. At least one data item of the plurality of stored data items can be modified 1150 based on the input data. After the modifying of the at least one data item, the first data item and second data item can be linked. One or more resource creation rules can then be applied 1160 to the updated graph representation to determine a plurality of resources. Each resource of the plurality of resources can comprise at least one data item. The determined plurality of resources can be saved 1170 to durable storage, the determined plurality of resources comprising the one or more received data items and the modified at least one data item.

Figure 12:
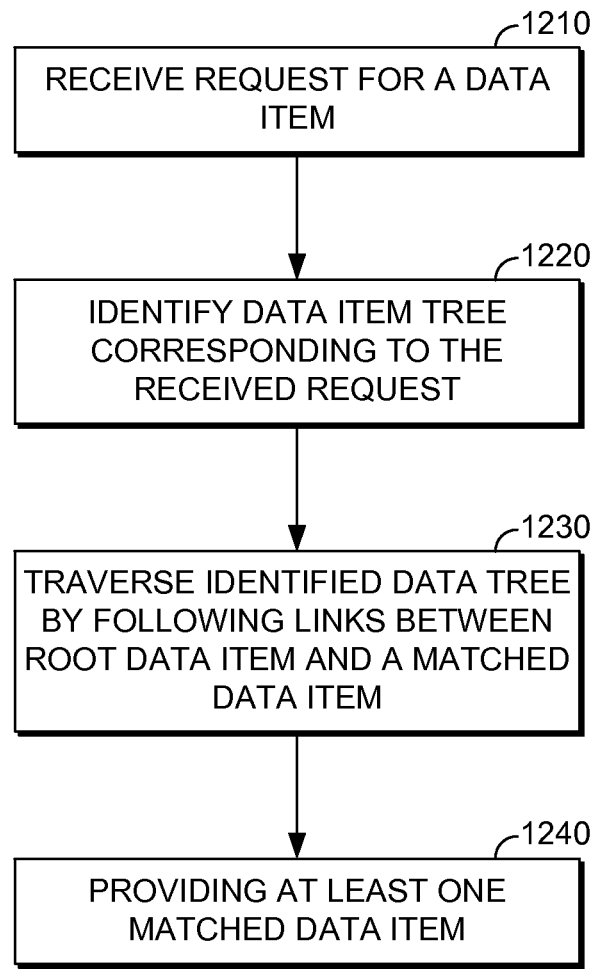
FIG. 12 shows an example of a process flow according to an aspect described herein.

FIG. 12 shows an example of a method for retrieving data in a distributed storage environment according to various aspects described herein. In FIG. 12, a request is received 1210 for a data item. A data item tree corresponding to the received request can be identified 1220. The data item tree can comprise a plurality of data items stored according to a linked data model, and the data items in the identified data item tree can be linked together so that each data item in the identified data item tree can be accessed from any other data item in the identified data item tree by traversing links between data items. The identified data item tree from the matched resource can be traversed 1230 by following one or more links between a root data item and at least one data item matching the received request. The matched at least one data item can then be provided 1240 in response to the received request.

ADDITIONAL EMBODIMENTS

Embodiment 1

A method for storing data in a distributed storage environment, the method comprising: receiving input data comprising one or more received data items and a corresponding graph representation, the graph representation including a representation of the one or more data items, the graph representation having a tree format, the graph representation including a representation of at least one link between a first data item from the one or more received data items and second data item from a resource saved in durable storage; applying a plurality of resource determination rules to the graph representation to identify at least one missing resource, the at least one missing resource comprising a plurality of stored data items, the plurality of stored data items including the second data item; loading the at least one missing resource; updating the graph representation to include a representation of the plurality of stored data items of the at least one missing resource; modifying at least one data item of the plurality of stored data items based on the input data, the first data item and second data item being linked after the modifying of the at least one data item; applying one or more resource creation rules to the updated graph representation to determine a plurality of resources, each resource of the plurality of resources comprising at least one data item; and saving the determined plurality of resources to durable storage, the determined plurality of resources comprising the one or more received data items and the modified at least one data item.

Embodiment 2

The method of Embodiment 1, wherein the modified at least one data item is modified to include a link to a received data item.

Embodiment 3

The method of any of the above embodiments, wherein modifying the at least one data item of the plurality of stored data items comprises replacing the at least one data item of the plurality of stored data items with at least one received data item.

Embodiment 4

The method of any of the above embodiments, wherein two or more resources of the at least one missing resource comprise a third data item.

Embodiment 5

The method of any of the above embodiments, wherein two or more resources of the plurality of determined resources comprise at least one data item from the received one or more data items.

Embodiment 6

The method of any of the above embodiments, wherein the link between the first data item and the second data item comprises a two way link.

Embodiment 7

The method of any of the above embodiments, wherein applying the resource determination rules comprises adding data items from the identified missing resources to a missing resource list; and adding data items from the missing resource list to a resource list, the updating of the graph

19 representation being based on the resource list after the adding of the data items from the missing resource list.

Embodiment 8

The method of any of the above embodiments, wherein the saved plurality of determined resources comprise an append-only database.

Embodiment 9

The method of any of the above embodiments 9, wherein the input data comprises data in an RDF format.

Embodiment 10

The method of any of the above embodiments, wherein the save plurality of determined resources comprise a plurality of data item trees, each data item tree having a root data item.

Embodiment 11

A method for retrieving data in a distributed storage environment, the method comprising: receiving a request for a data item; identifying a data item tree corresponding to the received request, the data item tree comprising a plurality of data items stored according to a linked data model, the data items in the identified data item tree being linked together so that each data item in the identified data item tree can be accessed from any other data item in the identified data item tree by traversing links between data items; traversing the identified data item tree from the matched resource by following one or more links between a root data item and at least one data item matching the received request; and providing, responsive to the received request, the matched at least one data item.

Embodiment 12

The method of Embodiment 11, further comprising: caching the matched at least one data item; receiving a second request, the cached at least one data item matching the received second request; and providing, responsive to the received second request, the cached at least one data item.

Embodiment 13

The method of Embodiment 11 or 12, wherein each of the plurality of stored data items further comprises a distinct address.

Embodiment 14

The method of any of Embodiments 11 to 13, wherein providing the matched at least one data item comprises extracting data from the matched at least one data item and providing the extracted data.

Embodiment 15

A system for storing and retrieving data in a distributed storage environment, the system comprising: durable storage comprising a plurality of physical storage devices; one or more processors having associated memory, the associated memory including computer-executable instructions executed by the one or more processors to provide: a plurality of resource determination rules; a plurality of resource creation rules; a Linked Data Processor for reading stored data items into memory based on the plurality of resource determination rules and for storing data items to the durable storage based on the plurality of resource creation rules; and a plurality of data item trees comprising data items linked by two-way links, each data item tree comprising a root data item and one or more data items linked to at least one other data item, each data item comprising a data item address.

Embodiment 16

The system of Embodiment 15, wherein at least two data item trees comprising a first data item.

Embodiment 17

The system of Embodiment 15 or 16, the system further comprising a graph store component.

Embodiment 18

The system of any of Embodiments 15 to 17, further comprising resource list, a deduced resource list, and a missing resource list.

Embodiment 19

The system of any of Embodiments 15 to 18, further comprising a content delivery network for caching data items from the durable storage and for matching requests for data items with cached data items, data items from durable storage, or a combination thereof.

Embodiment 20

The system of any of Embodiments 15 to 19, wherein the data item trees comprise an append-only database.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

What is claimed is:

1. A method for storing data in a distributed storage environment, the method comprising:
   receiving input data comprising one or more received data items and a corresponding graph representation, the graph representation including a representation of the one or more data items, the graph representation having a tree format, the graph representation including a representation of at least one link between a first data item from the one or more received data items and a second data item from a resource saved in durable storage;
   applying a plurality of resource determination rules to the graph representation to identify at least one missing resource, the at least one missing resource comprising a plurality of stored data items, the plurality of stored data items including the second data item;

loading the at least one missing resource;

updating the graph representation to include a representation of the plurality of stored data items of the at least one missing resource;

modifying at least one data item of the plurality of stored data items based on the input data, the first data item and the second data item being linked after the modifying of the at least one data item;

applying one or more resource creation rules to the updated graph representation to determine a plurality of resources, each resource of the plurality of resources comprising at least one data item; and saving the determined plurality of resources to durable storage, the determined plurality of resources comprising the one or more received data items and the modified at least one data item.

2. The method of claim 1, wherein the modified at least one data item is modified to include a link to a received data item.

3. The method of claim 1, wherein modifying the at least one data item of the plurality of stored data items comprises replacing the at least one data item of the plurality of stored data items with at least one received data item.

4. The method of claim 1, wherein two or more resources of the at least one missing resource comprise a third data item.

5. The method of claim 1, wherein two or more resources of the plurality of determined resources comprise at least one data item from the received one or more data items.

6. The method of claim 1, wherein the link between the first data item and the second data item comprises a two way link.

7. The method of claim 1, wherein applying the resource determination rules comprises adding data items from the identified missing resources to a missing resource list; and adding data items from the missing resource list to a resource list, the updating of the graph representation being based on the resource list after the adding of the data items from the missing resource list.

8. The method of claim 1, wherein the saved plurality of determined resources comprise an append-only database.

9. The method of claim 1, wherein the input data comprises data in a Resource Description Framework (RDF) format.

10. The method of claim 1, wherein the plurality of determined resources comprise a plurality of data item trees, each data item tree having a root data item.

* * * * *